United States Patent
Komiyama (10) Patent No.: US 6,690,955 B1
(45) Date of Patent: Feb. 10, 2004

(54) COMMUNICATION DEVICE AND METHOD FOR PRODUCING A COLOR ILLUMINATION UNIQUELY IDENTIFYING A CALLING SOURCE

(75) Inventor: Takehiko Komiyama, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/531,112

(22) Filed: Mar. 17, 2000

(30) Foreign Application Priority Data

Mar. 19, 1999 (JP) .......................................... 11-076131

(51) Int. Cl.⁷ .............................. H04B 1/38; H04M 1/00
(52) U.S. Cl. ...................... 455/566; 455/575; 455/415; 455/567; 455/90; 345/158; 379/142.06; 379/142.17
(58) Field of Search ..................... 455/90, 415, 566, 455/567, 550, 575; 379/127.01, 142.06, 142.17, 245, 247, 354, 142.01, 242, 350; 345/158, 156, 157

(56) References Cited

U.S. PATENT DOCUMENTS

| | | | |
|---|---|---|---|
| 4,726,059 A | | 2/1988 | Havel .......................... 379/354 |
| 5,903,634 A | * | 5/1999 | Wakabayashi et al. . 379/127.01 |
| 5,946,636 A | * | 8/1999 | Uyeno et al. ................ 455/566 |
| 6,438,390 B1 | * | 8/2002 | Awan .......................... 455/566 |
| 6,438,391 B1 | * | 8/2002 | Wang .......................... 455/566 |

FOREIGN PATENT DOCUMENTS

| | | |
|---|---|---|
| JP | 5-68154 | 9/1993 |
| JP | 7-288569 | 10/1995 |
| JP | 8-265413 | 10/1996 |
| JP | 10-126827 | 5/1998 |
| JP | 10-145475 | 5/1998 |
| JP | 11-220524 | 8/1999 |

* cited by examiner

*Primary Examiner*—Nay Maung
*Assistant Examiner*—Edan Orgad
(74) *Attorney, Agent, or Firm*—Dickstein, Shapiro, Morin & Oshinsky, LLP.

(57) ABSTRACT

In a communication device, a number of source identifying information are stored in a memory for respectively identifying calling sources and a number of color information corresponding to the source identifying information are also stored in the memory. When a call is received, the memory is searched for source identifying information identifying the source of the received call. If such identifying information is detected, a lighting arrangement is energized according to the color information stored in the memory corresponding to the detected source identifying information.

36 Claims, 7 Drawing Sheets

COLOR REGISTRATION MEMORY

| INDEX (i) ₍21 | RED ₍22 | GREEN ₍23 | BLUE ₍24 |
|---|---|---|---|
| 1 | 3 | 0 | 0 |
| 2 | 2 | 0 | 2 |
| ⋮ | ⋮ | ⋮ | ⋮ |
|  |  |  |  |

FIG. 5

COLOR ASSIGNMENT MEMORY

| PHONE NUMBER | RED | GREEN | BLUE |
|---|---|---|---|
| 09012345678 | 3 | 0 | 3 |
| 0312345678 | 3 | 0 | 0 |
| 09087564321 | 1 | 0 | 2 |
| 0322224444 | 1 | 3 | 3 |
| ⋮ | ⋮ | ⋮ | ⋮ |
|  |  |  |  |

FIG. 6

COLOR REGISTRATION MODE

FIG. 8

COMMUNICATION DEVICE AND METHOD FOR PRODUCING A COLOR ILLUMINATION UNIQUELY IDENTIFYING A CALLING SOURCE

BACKGROUND OF THE INVENTION

1. Field of the Invention

The present invention relates generally to communication devices and more specifically to a technique for identifying a received call.

2. Description of the Related Art

In conventional cellular mobile telephone systems, when a mobile telephone is called, the telephone number of the calling party is transmitted to the called unit and displayed on that unit to allow the called user to identify the calling user before he answers the call. Therefore, mobile users can determine whether a received call is from a known personnel or not.

However, because of the portability of mobile phones, their display panel is too small to display called digits in sufficiently large size to allow users to quickly recognize the received phone number. This often causes users to answer calls dialed by a wrong number.

The mobile phone unit disclosed in Japanese Laid-Open Patent Application 10-145475 pre-stores calling party's phone numbers in a registration memory. When the user is alerted by receipt of a call, it contains the phone number of the calling unit and the control unit determines whether the phone number of the calling party's is stored in the registration memory. The control unit turns on the liquid crystal display (LCD) panel and illuminates it with a green background light which is stored in a background color setting memory if the calling party's phone number is stored in the registration memory. Otherwise, the control unit illuminates the LCD panel with red background light.

Although the user can determine whether or not a received call is registered, he still has to look closely into the display panel to read the displayed phone number digits.

SUMMARY OF THE INVENTION

It is therefore an object of the present invention to provide a device and method of communication for providing individual color background lighting for incoming calls for allowing users to identify the originating source of a call without having the trouble of reading displayed phone numbers.

According to a first aspect of the present invention, there is provided a communication device comprising a memory for storing a plurality of source identifying information for respectively identifying calling sources and a plurality of color information corresponding to the plurality of source identifying information, receiving circuitry for receiving a call, detecting circuitry for detecting, in the memory, source identifying information identifying the source of the received call, and a lighting arrangement operable according to the color information stored in the memory corresponding to the detected source identifying information.

Since the lighting arrangement gives off light of a color that is unique to a particular calling source only when the source identifying information of the source is stored in the memory, the owner of the communication device can readily identify the calling party.

According to a second aspect, the present invention provides a communication device comprising a keypad, a lighting arrangement, and a memory in which a plurality of source identifying information are stored for identifying calling sources. Control circuitry is responsive to color setting signals from the keypad for energizing the lighting arrangement and storing, in the memory, a plurality of color information corresponding to the plurality of source identifying information. When a call is received, the control circuitry makes a search through the memory for detecting source identifying information identifying the source of the received call, and energizes the lighting arrangement according to the color information stored in the memory corresponding to the detected source identifying information.

According to a third aspect, the present invention provides a communication device comprising a keypad, a lighting arrangement, a first table for storing a plurality of source identifying information identifying calling sources, and a second table. Control circuitry is responsive to color setting signals from the keypad for energizing the lighting arrangement and storing a plurality of color information in the second table corresponding to the plurality of source identifying information. In response to an assignment signal from the keypad, the control circuitry selects color information from the second table and energizes the lighting arrangement according to the selected color information, and sets the selected color information in the first table corresponding to one of the plurality of source identifying information. In response to a call, the control circuitry makes a search through the first table for detecting source identifying information identifying the source of the received call, and energizes the lighting arrangement according to the color information set in the first table corresponding to the detected source identifying information.

According to a fourth aspect, the present invention provides a communication method comprising the steps of storing, in a memory, a plurality of source identifying information for respectively identifying calling sources and a plurality of color information corresponding to said plurality of source identifying information, receiving a call, making a search through said memory for detecting source identifying information identifying the source of the received call, and producing a color illumination according to the color information stored in said memory corresponding to the detected source identifying information.

According to a fifth aspect, the present invention provides a communication method for a terminal device which includes a keypad, a lighting arrangement, and a memory having a plurality of source identifying information respectively identifying calling sources, the method comprising the steps of energizing the lighting arrangement and storing, in said memory, a plurality of color information according to color setting signals from said keypad corresponding to said plurality of color information, receiving a call, making a search through said memory for detecting source identifying information identifying the source of the received call, and energizing the lighting arrangement according to the color information stored in said memory corresponding to the detected source identifying information.

According to a sixth aspect, the present invention provides a method for a communication device which includes a keypad, a lighting arrangement, a first table in which a plurality of source identifying information are stored for respectively identifying calling sources, and a second table, the method comprising the steps of energizing the lighting arrangement and storing a plurality of color information in said first table according to color setting signals, selecting color information from the second table in response to an assignment signal from said keypad and energizing the lighting arrangement according to the selected color information, and setting the selected color information in the first table corresponding to one of said plurality of source identifying information, receiving a call, making a search through said first table for detecting source identifying information identifying the source of the received call, and energizing the lighting arrangement according to the color information set in said first table corresponding to the detected source identifying information.

BRIEF DESCRIPTION OF THE DRAWINGS

The present invention will be described in further detail with reference to the accompanying drawings, in which.

DETAILED DESCRIPTION

Figure 1:
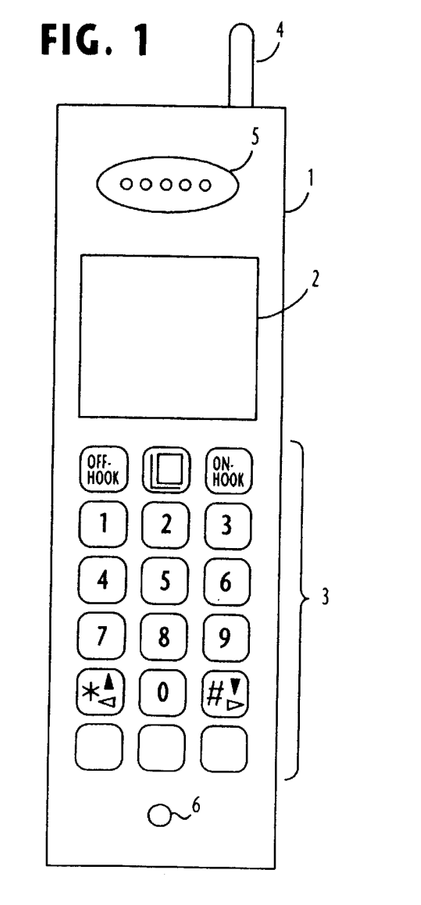
FIG. 1 is a front view of a mobile phone unit embodying the present invention.
Figure 2:
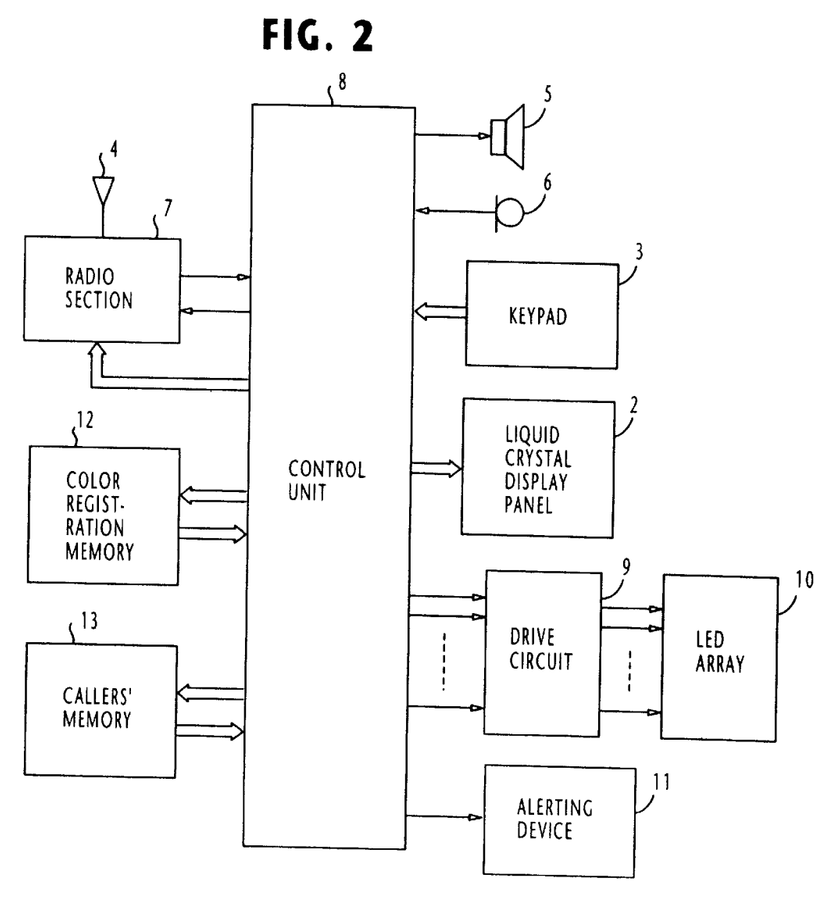
FIG. 2 is a block diagram of the mobile unit of FIG. 1.

In FIGS. 1 and 2, there is shown a wireless communication device of the present invention such as a cellular mobile unit 1. Mobile unit 1 has a liquid crystal display (LCD) panel 2 and a keypad 3 of a 3×6 matrix array which includes numeric keys, function keys and a off-hook and on-hook keys, scroll keys. For speech communication, a loudspeaker 5 and a microphone 6 are provided. A radio section 7 operates with an antenna 4 to establish a wireless link to a cell-site base station.

A color registration memory 12 and a callers' memory 13 are provided. The color registration memory 12 is used to map a plurality of blend colors to corresponding sets of primary colors of different brightness levels with which the LED array 10 is energized to illuminate the LCD panel 2. The callers' memory 13 is used to map the color settings of memory 12 to different calling parties identified by phone numbers or names) and corresponding brightness levels with which the LCD panel 2 is illuminated with light of blend colors specified by the stored identifies of calling parties.

A control unit 8 provides initial setting of the color registration memory 12 by allowing the user to register a plurality of desired blend colors with which the LCD panel 2 will be illuminated by a background lighting arrangement when a call is received. During color assignment mode, the control unit 8 allows the user to store callers' identities such as personal or public names in the caller's memory 13 and maps corresponding blend colors to the caller's identities.

When a calling signal is received from the radio section 7, the control unit examines the caller's memory 13 and displays on the LCD panel 2 a caller's name if it is found in the memory 13 or a phone number contained in the received signal if no corresponding name is found and energizes a the LED array 10 through a driving circuit 9 to illuminate the LCD panel 2 with light of a blend color specified for the incoming call, and alerts the user with an alerting device 11.

Figures 3A, 3B:
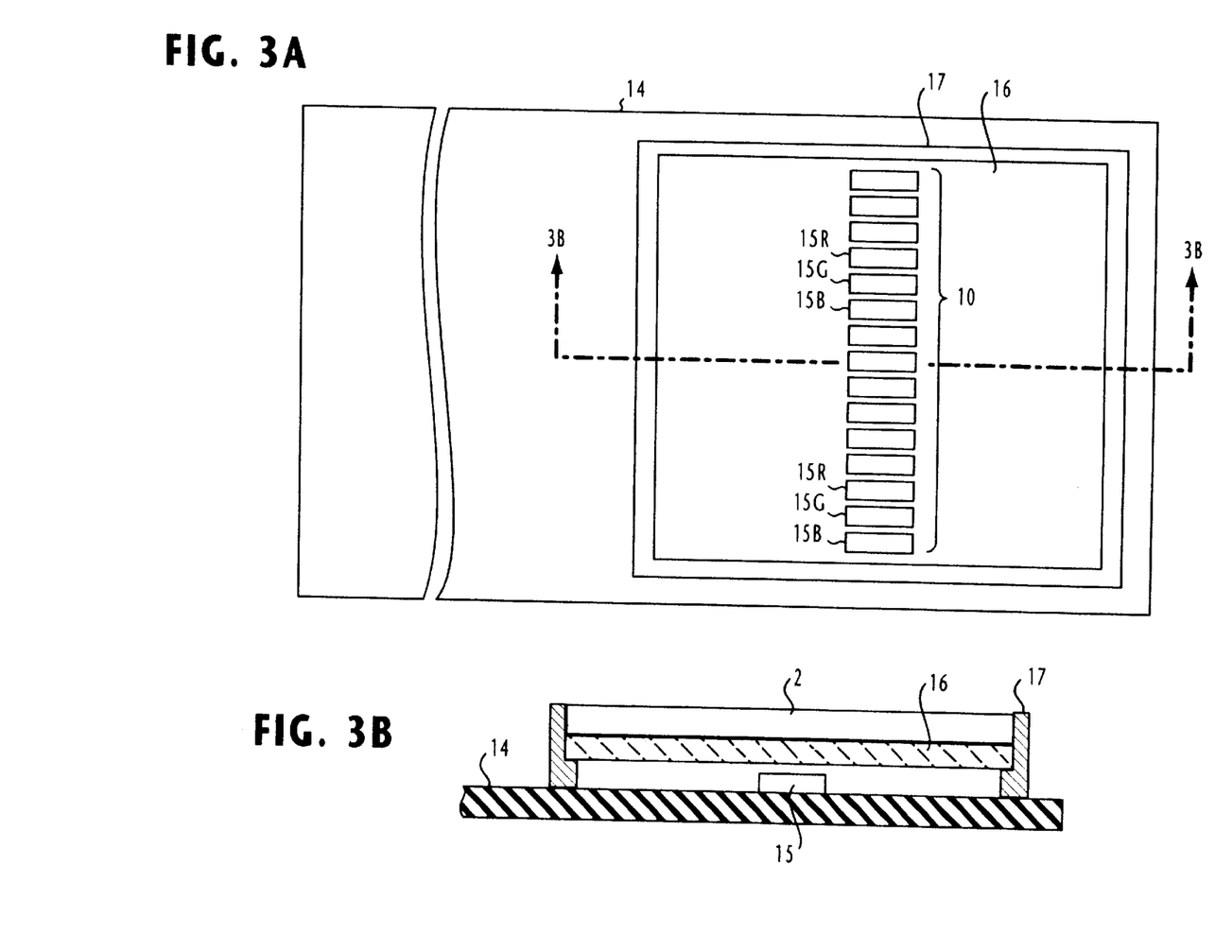
FIG. 3A is a plan view of a background lighting arrangement of a liquid crystal display according to the present invention.
FIG. 3B is a cross-sectional view taken along the lines 3B and 3B of FIG. 3A.

The background lighting arrangement is shown in FIGS. 3A and 3B. In this arrangement, the LED array 10 is secured on a circuit board 14 and consists of an array of groups of light emitting diodes 15A, 15G, 15B for emission of light of primary colors, i.e., red, green and blue. The LED array 10 is overlaid with a translucent member 16 for uniformly diffusing light rays from below to serve as background color lighting for the LCD panel 2, which is secured in a frame 17 above the translucent member 16. The LCD panel 2 is fixed in the frame 17 as shown in FIG. 3B above the translucent member 16.

Figure 4:
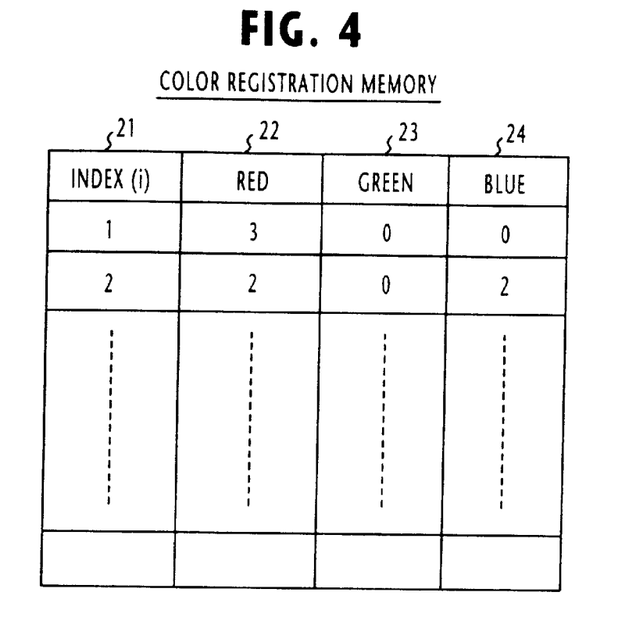
FIG. 4 shows an internal structure of a color registration memory.
Figure 5:
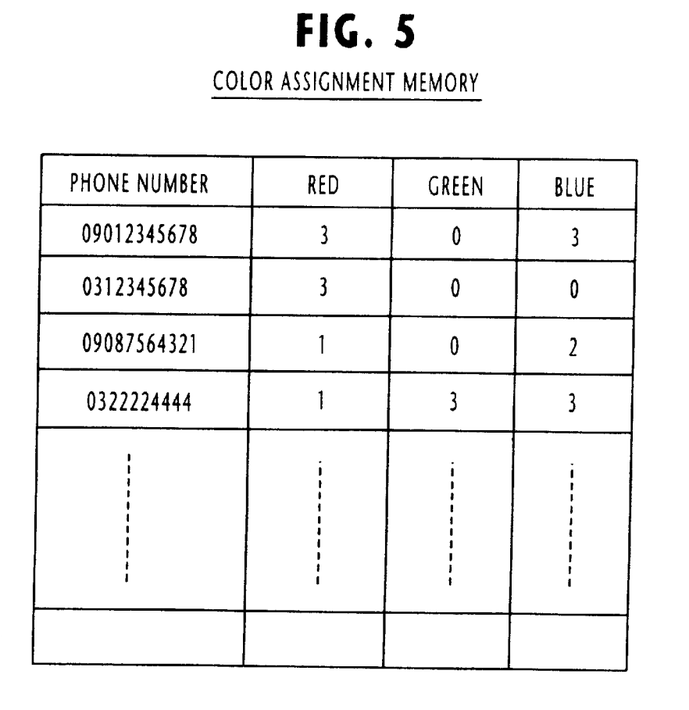
FIG. 5 shows an internal structure of a callers' memory.

Details of the table memories 13 and 14 are respectively shown in FIGS. 4 and 5.

In FIG. 4, the color registration memory 12 is partitioned into rows and columns, with the column 21 defining index numbers for identifying the rows, and the columns 22, 23 and 24 respectively defining brightness levels of the primary colors of red, green and blue for the respective light emitting diodes 15 of each group of the LED array. In the illustrated example, brightness data red=3, green=0, and blue=0 are stored in the row of index number i=1, and red=2, green=0, and blue=2 are stored in the row of index number i=2.

In FIG. 5, the caller's memory 13 has a plurality of entries in which callers' phone numbers are mapped to respective sets of brightness levels.

The color registration memory 12 and color assignment memory 13 are respectively set during color registration mode and color assignment mode according to input data manually entered through the keypad 3 to the control unit 8 when the user determines desired blend colors and when the user subsequently assigns the determined colors to calling numbers.

Figure 6:
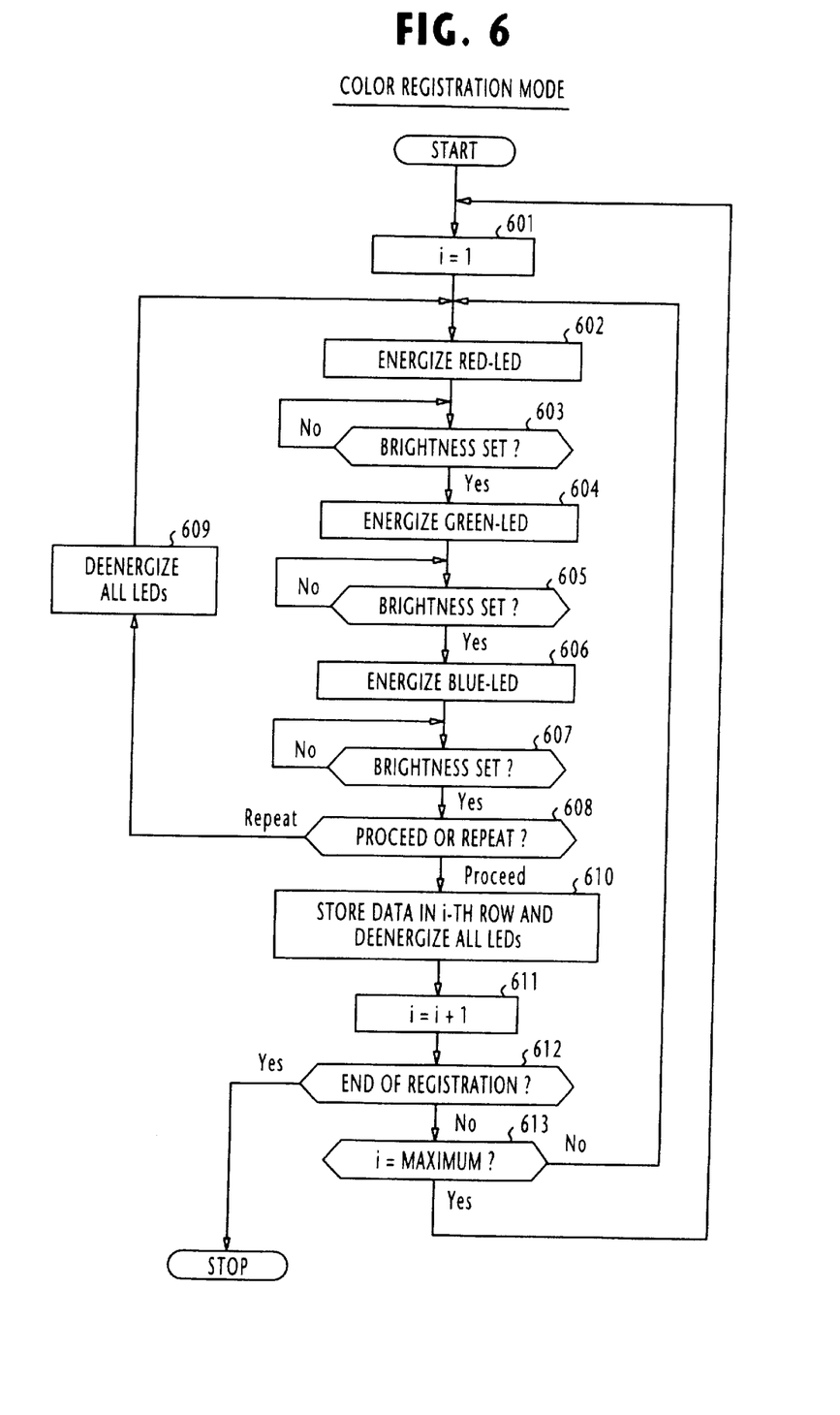
FIG. 6 is a flowchart illustrating the operation of a control unit when blend color data is stored in the color registration memory.

The operation of the control unit 8 during the color registration mode proceeds according to the flowchart of FIG. 6. Control unit 8 is set in a color registration mode when the user operates a predetermined one or a predetermined set of keys in the keypad 3.

A color registration routine starts with step 601 in which "1" is set to a variable "i" that identifies the index number of memory 12, and proceeds to step 602 to energize red-light emitting diodes and monitors operated-key input from the keypad 3. The user is allowed to check and control the red-color lighting level at one of four levels, i.e., the first (lowest or turn-off), second, third and fourth (highest) brightness levels respectively represented by "0", "1", "2" and "3". At decision step 603, the control unit 8 checks to see if the brightness level of the red color lighting is determined and set. With the red color setting being completed, the red-emitting diodes are continuously energized at the set level, and flow proceeds to step 604 to energize green-light emitting diodes. The user now sees a blend of red and green colors and adjusts the brightness of the green-color emitting diodes at one of the four levels.

When the brightness of green-color lighting is set (step 605), both red- and green-light emitting diodes are continuously energized at the respectively set values, and the control unit proceeds to step 606 to energize blue-light emitting diodes and checks for a subsequent key operation for the blue-color lighting. The user checks the blend of red, green and blue colors and determines the blue-color lighting level and hence the hue, tint and tone of the mixed three primary colors. When the user is satisfied with the background lighting level of the LCD panel, he operates a key that indicates that control unit 8 should proceed to the next routine. Otherwise, the user operates a key that indicates control unit 8 should repeat the same routine. The operation of such keys is checked at step 608. If the user is not satisfied with the blend color light level, flow branches out from step 608 to step 609 to de-energize all light emitting diodes and returns to step 602 to repeat the process. If the user is satisfied with the blend color setting, control unit 8 proceeds from step 608 to step 610 to store data indicating the three brightness levels in the i-th row of the color registration memory 12 and de-energizes all light emitting diodes.

The variable "i" is then incremented by one at step 611. At step 612, the control unit 8 checks to see if an end-of-registration command is entered from keypad 3. If so, flow proceeds to the end of the routine. If the decision is negative at step 612, the control unit 8 checks to see if the color registration memory 12 is full, at step 613. If the memory 12 is not full, the variable "i" is not equal to a maximum number, flow returns to step 602 to repeat the process. If the color registration memory 12 is full, flow returns to step 601 to restart the operation of the routine.

Figure 7:
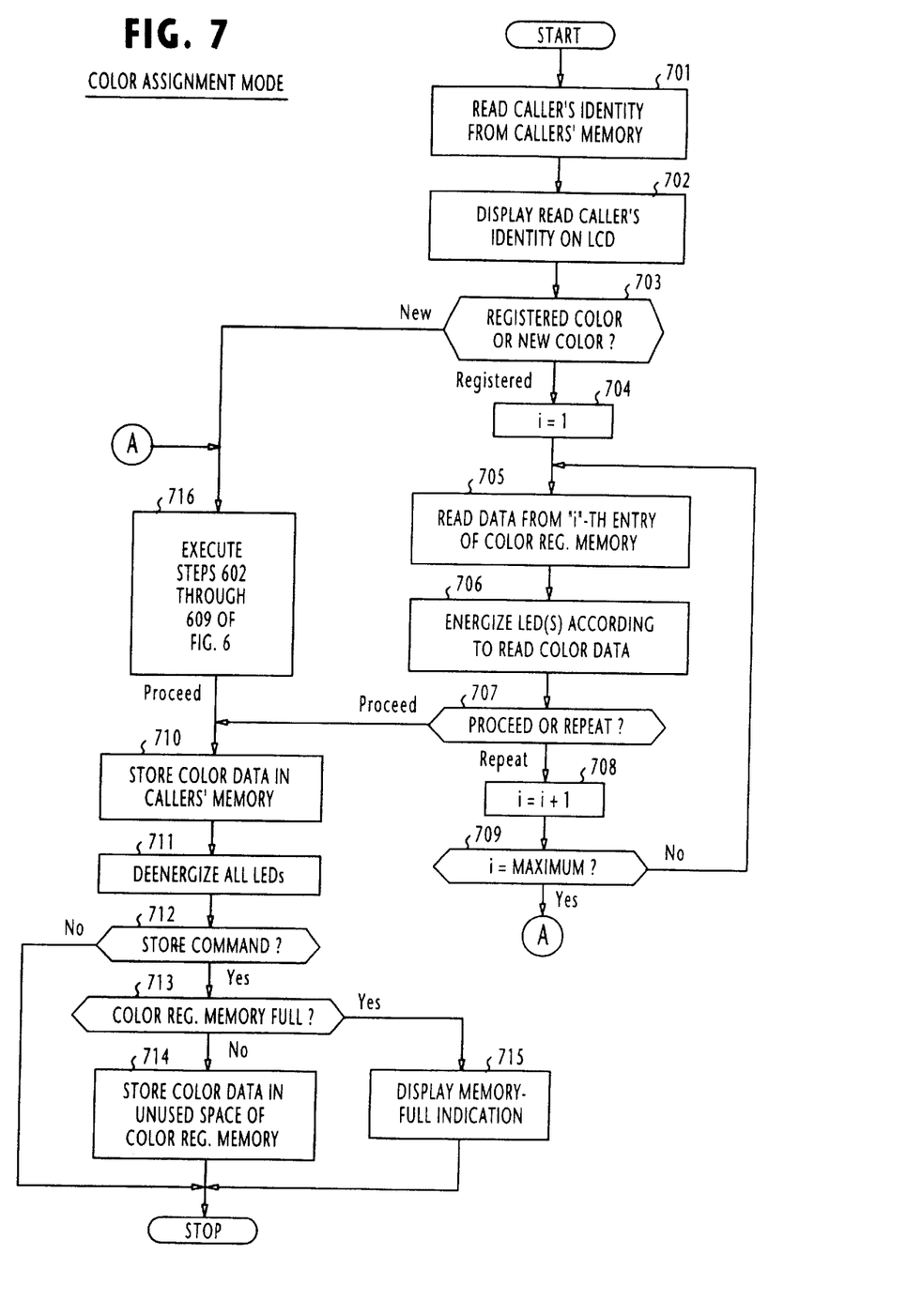
FIG. 7 is a flowchart illustrating the operation of the control unit when blend color data is individually assigned to callers' phone numbers stored in the caller's memory.

The operation of the control unit 8 during the color assignment mode proceeds according to the flowchart of FIG. 7.

A color assignment routine starts with step 701 to read a caller's identity from the callers' memory 13. Control unit 8 supplies the read identity to the LCD panel 2 (step 702) and the caller's identity is displayed. The user is urged to enter an indication whether a blend color registered in the memory 12 is to be assigned to the caller of the displayed identity or a new blend color is to be assigned. If the user indicates that a registered color is to be assigned, the user is urged to select data from one of the entries of the color registration memory 12. Control unit 8 proceeds from step 703 to step 704 to set the variable "i" to 1 and read color data from the i-th entry of the color registration memory 12 (step 705). At step 706, the LED array 10 is energized at brightness levels specified by the retrieved blend color data. The LCD panel 2 is thus background-illuminated in a specified blend color. The user is thus allowed to check this color lighting and determine if it is satisfactory or not for the calling number. He enters a command indicating that the control unit 8 should repeat the process if the background lighting is not acceptable. In response, the control unit 8 proceeds to step 708 to increment the variable "i" by one and returns to step 705 if the variable "i" does not equals the maximum value (step 709).

If the user is satisfied with the background lighting, he enters a command indicating that the control unit 8 should proceed (step 707). In response to this command signal, the control unit 8 proceeds from step 707 to step 710 to store the color data in one entry of the caller's memory 13 corresponding to the calling identity which was retrieved from the memory 13 at step 701. The LED array 10 is then de-energized (step 711). The routine proceeds to step 712 to check to see if a store command is entered, indicating that the color data stored in the callers's memory 13 is also stored in the color registration memory 12. If this is the case, the routine proceeds to step 713 to determine if the color registration memory 12 is full. If the color registration memory 12 is not full, flow proceeds to step 714 to store the color data in an unused space (entry) of the color registration memory 12, and the routine is terminated. If the color registration memory 12 is full, the control unit 8 proceeds from step 713 to 715 to display a memory-full indication and terminates the routine.

If the user has entered a repeat command at step 707 and the variable "i" has reached the maximum value (step 709), or the user initially desires a new color (step 703), the routine proceeds to subroutine 716 to execute steps 602 to 609 of FIG. 6 to produce a set of brightness values for a new blend color and proceeds to step 710.

Drive circuit 9 is operated by the control unit 8 to energize the LED array 10 in response to the color data stored in the color registration memory 12 during the color registration mode and in response to the color data stored in the callers' memory 13 during the color assignment mode. Further, the drive circuit 9 is operated when the mobile unit receives a call in a manner as will be described later.

Figure 8:
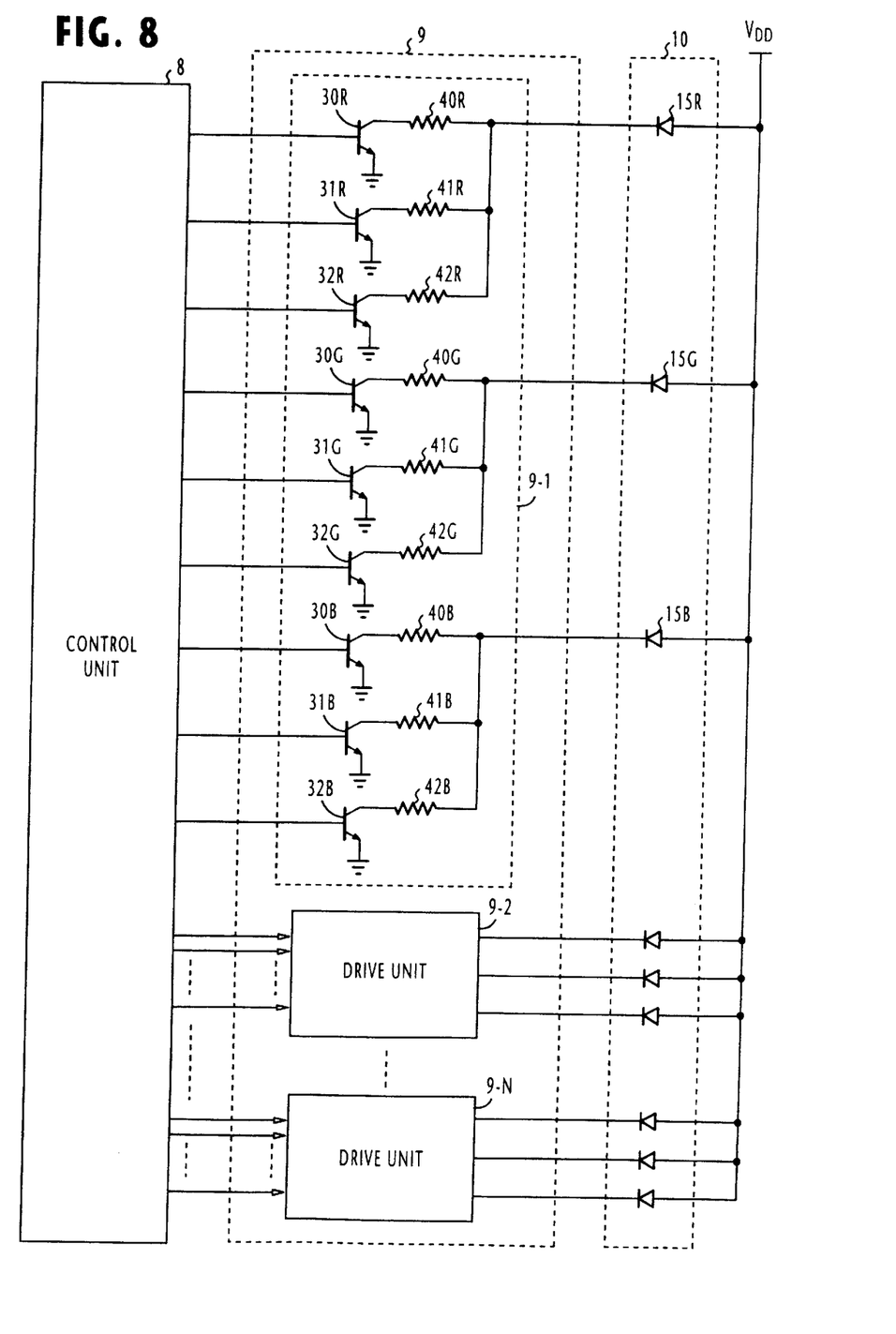
FIG. 8 is a circuit diagram of the LED driver circuit.

As shown in FIG. 8, the drive circuit 9 includes a plurality of drive units 9-1 to 9-N of identical configuration. Each drive unit is comprised by three groups of transistor-resistor circuits connected respectively to light emitting diodes 15 of different colors. Each transistor-resistor circuit comprises a transistor 30 and a current limiting resistor 40. Transistors 30 of each color group have their gates connected to respective output ports of the control unit 8 and their emitters connected to ground, with their collectors coupled through resistors 40 to the corresponding light emitting diode 15. In each color group, the resistor 40 has the greatest resistance value, the resistor 41 has a medium value and the resistor 42 has the lowest value.

Therefore, when the transistors 30R, 31R and 32R are individually turned on, the light emitting diode 15R gives off light of different intensities corresponding to brightness of the fourth (bright), third (medium) and second (dark) levels, respectively. When all of these transistors are turned off, the brightness level of the light emitting diode corresponds to the first level. As a result, there is a total of 64 combinations of brightness levels.

Figure 9:
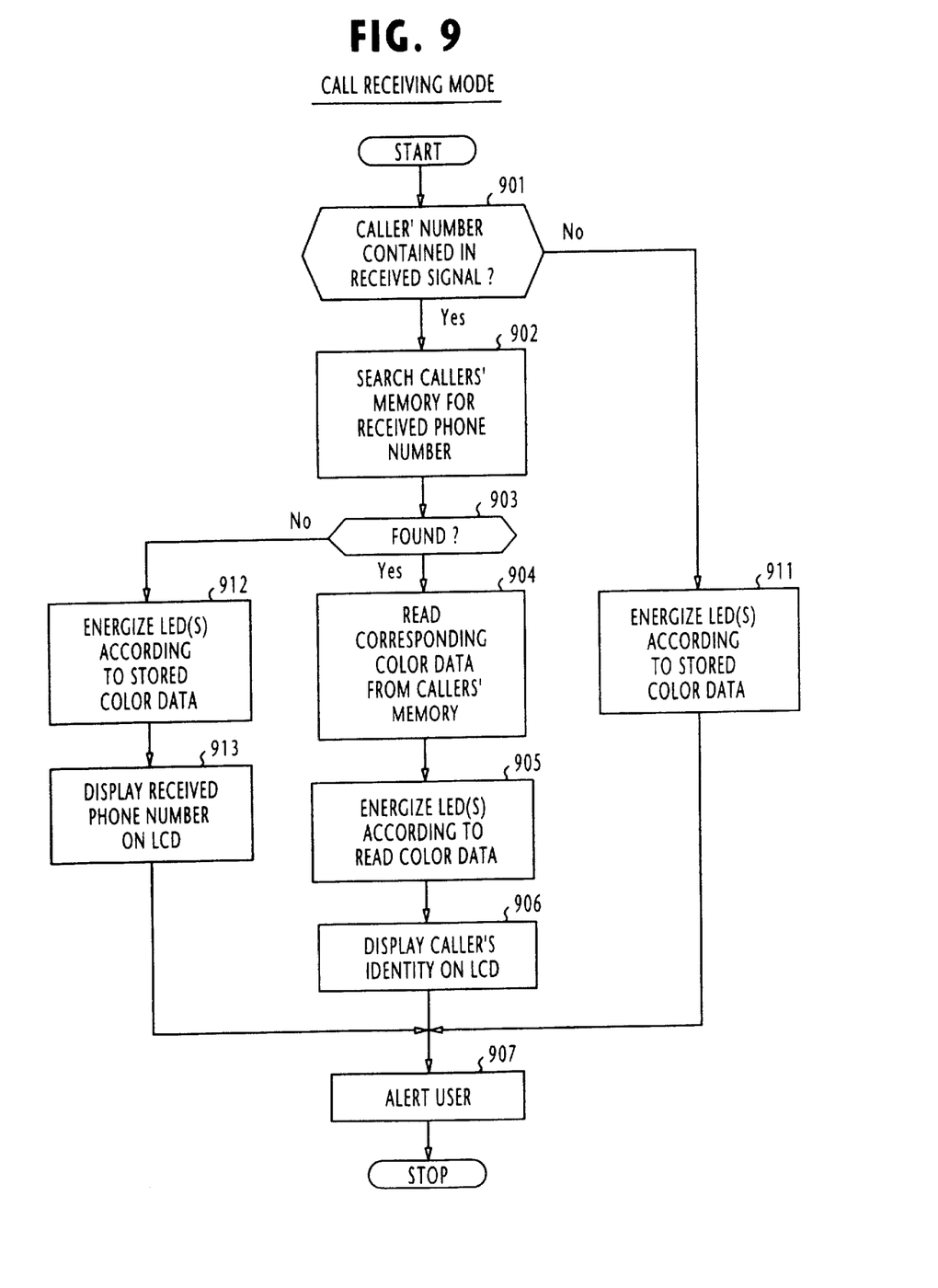
FIG. 9 is a flowchart illustrating the operation of the control unit when a call is received.

When a call is received from the network, the mobile unit operates according to the flowchart of FIG. 9.

When the control unit 8 receives an alert signal from the radio section 7, it checks to see if a caller's phone number is contained in the received signal (step 901). If there is one, flow proceeds to step 902 to search through the callers' memory 13 for the corresponding phone number. If the received phone number is found in the callers' memory 13 (step 903), the control unit 8 proceeds to step 904 to read the corresponding background lighting data from the callers' memory 13. According to the read background lighting data, the LED array 10 is energized to illuminate the LCD panel 2 (step 905) and the caller's identity is displayed on the illuminated LCD panel 2. The user is then alerted (step 907).

If no caller's phone number is contained in the received call, the decision at step 901 is negative and flow proceeds to step 911 to energize the LED array 10 according to stored data so that the LCD panel 2 is illuminated by background light of a predetermined blend color. The routine then proceeds to step 907 to alert the user.

If no phone number is stored in the callers' memory 13 corresponding to the received phone number, the decision at step 903 is negative and control proceeds to step 912 to energize the LED array 10 according to stored data so that the LCD panel is illuminated with background light of a predetermined blend color which may be different from the color of step 911. The received phone number is then put on display at step 913 and the user is alerted (step 907).

The operation of the control unit 8 will proceed as follows if the mobile unit receives the following exemplary phone numbers (source addresses).

If the received calling party's phone number is "0312345678", the brightness values in the memory 13 are "3" for red, "0" for green and blue. Therefore, the transistors 32R of all drive units are turned on and all other transistors are turned off. Since the current-limiting resistor 42R is of least resistance value of the red-color group, all red light emitting diodes 15R are shone brightly, while all the other light emitting diodes 15G and 1 5B give off no light. As a result, the LCD panel 2 is brightly illuminated with red background lighting.

If phone number "09087564321 " is received, the brightness values stored in the memory 13 are "1" for red, "0" for green and "2" for blue. Therefore, the control unit 8 turns on transistors 30R, 31B of all drive units and turns off all other transistors. Since the current-limiting resistor 40R is of highest value of the red color group and the resistor 41B is of medium value of the blue color group, all red light emitting diodes 15R of all are darkened and all blue light emitting diode 15B are shone at medium brightness level and all green light emitting diodes 15B give off no light. As a result, the LCD panel 2 is illuminated with a blended color of dark red light and blue light of medium brightness.

In addition, when a calling party's phone number "0322224444" is received, the brightness values stored in the memory 13 are "1" for red, "3" for green and blue. Control unit 8 turns on transistors 30R, 32G and 32B of all drive units and turns off all other transistors. Since the current-limiting resistor 40R is of highest value of the red color group and the current-limiting resistors 42 G and 42 B are of least resistance value of their color group, all red light emitting diodes 15R are darkened and all blue and green light emitting diodes 15G and 15B are shone brightly. As a result, the LCD panel 2 is illuminated with background light of a blended color of dark red and bright blue and green.

While mention has been made of an embodiment in which the LCD panel 2 is illuminated with continuous light, the present invention could be altered so that the illumination may be interrupted at intervals. Such intervals may be changed according to different calling phone numbers.

What is claimed is:

1. A communication device comprising:
    a memory for storing, in a first table, a plurality of source identifying information for respectively identifying calling sources and, in a second table, a plurality of color information corresponding to said plurality of source identifying information;
    receiving circuitry for receiving a call;
    detecting circuitry for detecting, by searching said first table in said memory, source identifying information identifying the source of the received call; and
    a lighting arrangement for producing a color illumination according to the color information stored in said second table in said memory corresponding to the detected source identifying information.

2. A communication device as claimed in claim 1, further comprising a display panel for displaying the detected source identifying information, wherein said lighting arrangement is configured to illuminate the display panel.

3. A communication device as claimed in claim 1, wherein said source identifying information is a phone number.

4. A communication device as claimed in claim 1, wherein said lighting arrangement comprises:
    a plurality of groups of light emitting diodes, the light emitting diodes of each group producing light of primary colors; and
    driving circuitry for individually controlling said light emitting diodes at different brightness according to color information stored in said second table of said memory.

5. A communication device as claimed in claim 4, wherein said driving circuitry includes a plurality of transistors and a plurality of current-limiting resistors connected respectively to the plurality of transistors.

6. A communication device as claimed in claim 4, wherein said lighting arrangement further comprises a translucent member overlying said plurality of groups of light emitting diodes for illuminating said display panel as background lighting.

7. A communication device as claimed in claim 1, wherein said receiving circuitry comprises means for receiving mobile communication signals.

8. A communication device as claimed in claim 1, wherein said color illumination is interrupted at intervals corresponding to the detected source identifying information.

9. A communication device comprising:
    a keypad;
    a lighting arrangement;
    a memory having a first table and a second table; and
    control circuitry for energizing the lighting arrangement and storing, in said second table in said memory, a plurality of color information according to color setting signals from said keypad, and storing, in said first table in said memory, a plurality of source identifying information respectively identifying calling sources corresponding to said plurality of color information; and
    receiving circuitry for receiving a call,
    said control circuitry being responsive to the call for making a search through said first table in said memory for detecting source identifying information identifying the source of the received call, and energizing the lighting arrangement according to the color information stored in said second table in said memory corresponding to the detected source identifying information.

10. A communication device as claimed in claim 9, further comprising a display panel for displaying the detected source identifying information, wherein said lighting arrangement is configured to illuminate the display panel.

11. A communication device as claimed in claim 9, wherein said source identifying information is a phone number.

12. A communication device as claimed in claim 9, wherein said lighting arrangement comprises:
    a plurality of groups of light emitting diodes, the light emitting diodes of each group producing light of primary colors; and
    driving circuitry for individually controlling said light emitting diodes at different brightness according to color information stored in said second table in said memory.

13. A communication device as claimed in claim 12, wherein said driving circuitry includes a plurality of transistors and a plurality of current-limiting resistors connected respectively to the plurality of transistors.

14. A communication device as claimed in claim 12, wherein said lighting arrangement further comprises a translucent member overlying said plurality of groups of light emitting diodes for illuminating said display panel as background lighting.

15. A communication device as claimed in claim 9, wherein said receiving circuitry comprises means for receiving mobile communication signals.

16. A communication device as claimed in claim 9, wherein said control circuitry is arranged to interrupt said energized lighting arrangement at intervals corresponding to the detected source identifying information.

17. A communication device comprising:

a keypad;

a lighting arrangement;

a first table for storing a plurality of source identifying information respectively identifying calling sources;

a second table;

control circuitry for (a) energizing the lighting arrangement. and storing a plurality of color information in said second table according to color setting signals from said keypad, (b) selecting color information from the second table in response to an assignment signal from said keypad, (c) energizing the lighting arrangement according to the selected color information, and (d) setting the selected color information in the first table corresponding to one of said plurality of source identifying information; and receiving circuitry for receiving a call, said control circuitry being responsive to the call for making a search through said first table for detecting source identifying information identifying the source of the received call, and energizing the lighting arrangement according to the color information set in said first table corresponding to the detected source identifying information.

18. A communication device as claimed in claim 17, further comprising a display panel for displaying the detected source identifying information, wherein said lighting arrangement is configured to illuminate the display panel as background lighting.

19. A communication device as claimed in claim 17, wherein said source identifying information is a phone number.

20. A communication device as claimed in claim 17, wherein said lighting arrangement comprises:

a plurality of groups of light emitting diodes, the light emitting diodes of each group producing light of primary colors; and driving circuitry for individually controlling said light emitting diodes at different brightness according to color information of either of said first and second tables.

21. A communication device as claimed in claim 20, wherein said driving circuitry includes a plurality of transistors and a plurality of current-limiting resistors connected respectively to the plurality of transistors.

22. A communication device as claimed in claim 20, wherein said lighting arrangement further comprises a translucent member overlying said plurality of groups of light emitting diodes for illuminating said display panel as background lighting.

23. A communication device as claimed in claim 17, wherein said receiving circuitry comprises means for receiving mobile communication signals.

24. A communication device as claimed in claim 17, wherein said control circuitry is arranged to interrupt said energized lighting arrangement at intervals corresponding to the detected source identifying information.

25. A communication method comprising the steps of:

a) storing, in a first table in a memory, a plurality of source identifying information for respectively identifying calling sources and, in a second table in said memory a plurality of color information corresponding to said plurality of source identifying information;

b) receiving a call;

c) making a search through said first table in said memory for detecting source identifying information identifying the source of the received call; and d) producing a color illumination according to the color information stored in said second table in said memory corresponding to the detected source identifying information.

26. A communication method as claimed in claim 25, further comprising producing a predetermined color illumination if said search fails to detect said source identifying information in said first table in said memory.

27. A communication method as claimed in claim 25, further comprising displaying the detected source identifying information, wherein said color illumination is produced as background lighting of the displayed source identifying information.

28. A communication method as claimed in claim 25, wherein the step (b) comprises receiving said call via a mobile communication channel.

29. A communication method for a terminal device which includes a keypad, a lighting arrangement, and a memory having, in a first table in said memory, a plurality of source identifying information respectively identifying calling sources, the method comprising the steps of:

a) energizing the lighting arrangement and storing, in a second table in said memory, a plurality of color information according to color setting signals from said keypad corresponding to said plurality of color information;

b) receiving a call;

c) making a search through said first table in said memory for detecting source identifying information identifying the source of the received call; and d) energizing the lighting arrangement according to the color information stored in said second table in said memory corresponding to the detected source identifying information.

30. A communication method as claimed in claim 29, further comprising producing a predetermined color illumination if said search fails to detect said source identifying information in said first table in said memory.

31. A communication method as claimed in claim 29, further comprising displaying the detected source identifying information, wherein said color illumination is produced as background lighting of the displayed source identifying information.

32. A communication method as claimed in claim 29, wherein the step (b) comprises receiving said call via a mobile communication channel.

33. A communication method for a communication device which includes a keypad, a lighting arrangement, a first table in which a plurality of source identifying information are stored for respectively identifying calling sources, and a second table, the method comprising the steps of:

a) energizing the lighting arrangement and storing a plurality of color information in said first table according to color setting signals;

b) selecting color information from the second table in response to an assignment signal from said keypad and energizing the lighting arrangement according to the selected color information, and setting the selected color information in the first table corresponding to one of said plurality of source identifying information;

c) receiving a call;

d) making a search through said first table for detecting source identifying information identifying the source of the received call; and e) energizing the lighting arrangement according to the color information set in said first table corresponding to the detected source identifying information.

34. A communication method as claimed in claim 33, further comprising the step of energizing the lighting arrangement according to predetermined color information if said search fails to detect said source identifying information in said second table.

35. A communication method as claimed in claim 33, further comprising the step of displaying the detected source identifying information, wherein said color illumination is produced as background lighting of the displayed source identifying information.

36. A communication method as claimed in claim 33, wherein the step (c) comprises receiving said call via a mobile communication channel.

* * * * *